United States Patent Office 3,062,809
Patented Nov. 6, 1962

3,062,809
PROCESS FOR SIMULTANEOUSLY BLEACHING AND REDUCING THE VISCOSITY OF NITROCELLULOSE
James E. Lufkin, Woodbury, N.J., assignor to E. I. du Pont de Nemours and Company, Wilmington, Del., a corporation of Delaware
No Drawing. Filed Mar. 6, 1961, Ser. No. 93,338
4 Claims. (Cl. 260—223)

The present invention relates to a method for producing nitrocellulose which is essentially free from undesirable color-imparting impurities.

In the manufacture of soluble nitrocellulose, i.e., low-viscosity nitrocellulose having a maximum nitrogen content of about 12.2% by weight, one of the problems encountered is the presence of offensive color-producing impurities. When such nitrocellulose is dissolved, for example, in a coating composition such as a lacquer, these impurities impart undesirable color to the coating. Obviously, the presence of color-producing impurities is particularly objectionable in nitrocellulose destined for use in high-grade, clear, i.e., unpigmented, lacquers to be applied to light-colored finishes. Color-free nitrocellulose is also required in the formulation of various plastics compositions.

In the past, the nitrocellulose has been treated with bleaching agents, such as hydrogen peroxide, ozone, chlorine dioxide, potassium permanganate, or sodium hypochlorite, in an attempt to remove the objectionable color. However, nitrocellulose bleached by these prior art methods is not completely satisfactory for the manufacture of all high-grade coating compositions, and the bleaching treatments involve additional expense in the manufacture of the nitrocellulose.

It has now been discovered that when the digestion of nitrocellulose conventionally used in the manufacture of this product to reduce its viscosity is carried out in very dilute aqueous nitric acid, soluble nitrocellulose having excellent color properties is obtained without separate bleaching treatment, i.e., nitrocellulose which does not impart undesirable color to coating compositions or plastics formulations.

In accordance with the present invention, soluble nitrocellulose suitable for use in high-grade plastics and clear lacquer formulations, etc., is prepared by adding sufficient nitric acid to an aqueous slurry of stabilized nitrocellulose to produce a slurry containing a measured concentration of nitric acid of from 0.10% to 0.50% by weight. The acidulated slurry is subjected to a simultaneous bleaching and reduction in viscosity at an elevated temperature under pressure. After the foregoing digestion, the nitrocellulose is washed with water until the used wash water is neutral.

The following examples illustrate the process of the present invention. In these examples, an arbitrary scale having a range of 1 to 7 was used to measure the color of the nitrocellulose solutions. A rating of 1 on this scale designated a water-white solution, a rating of 3 was a pale-yellow solution, and a rating of 7 represented a solution having a dark yellow color. Test solutions were compared visually against standard solutions. Nitrocellulose which, when dissolved in a standard solvent system, produces a test solution having a rating of 3 or less on the color scale is considered to be an acceptable product from the standpoint of commercial utility. The test solutions are those conventionally used for viscosity determinations on soluble nitrocellulose by the falling-ball method (ASTM D-301-56). Parts and percentages, where given in the examples, are by weight.

EXAMPLE 1

Shredded wood pulp was nitrated conventionally in a nitrating bath containing 28.0% of nitric acid, 50.5% of sulfuric acid, 16.5% of water, and 5.0% of nitrosulfuric acid. Spent acid was separated from the resulting nitrocellulose by centrifuging. The nitrocellulose was subjected to washing and boiling treatments to stabilize the product. The stabilized nitrocellulose having a nitrogen content of 12.0% was added to sufficient water to give a slurry containing about 6% solids. The acidity of the slurry was adjusted to 0.3% by the addition of 20% nitric acid. The acidulated slurry was then processed through a continuous digestion apparatus which provided a retention time of 12 minutes at 140° C. under a gage pressure of 115 pounds per square inch. The slurry was removed from the digester, excess liquor was drained off, and the nitrocellulose was spray-washed with water until the used wash water had a neutral pH. The nitrocellulose was dried and 12.2 parts of the dry nitrocellulose was dissolved in a solvent system consisting of 22.0 parts of ethanol, 48.3 parts of toluene, and 17.5 parts of ethyl acetate (Formula A; ASTM D-301-56). The resulting solution had a color of 3.

EXAMPLE 2

Stabilized nitrocellulose containing 12.0% nitrogen was mixed with water to form a slurry containing about 6% solids. The slurry was divided into aliquot portions. All but one of the portions were acidified to different acid concentrations with weak nitric acid. No acid was added to the remaining portion. All of the aliquots were digested for 20 minutes at 152° C. under a gage pressure of 110 pounds per square inch, and the digested nitrocellulose was washed to neutrality and dried. Dried nitrocellulose from each portion (12.2 parts) was dissolved in 87.8 parts of the ethanol-toluene-ethyl acetate solvent system described previously. The colors of the resulting solutions are given in Table I below.

Table I

| Aliquot No. | $HNO_3$ concentration of slurry before digestion, percent | Color of solution |
|---|---|---|
| 1[1] | 0.01 | 7 |
| 2 | 0.20 | 2.0 |
| 3 | 0.30 | 2.0 |
| 4 | 0.50 | 2.5 |

[1] No nitric acid added.

EXAMPLE 3

Shredded wood pulp was nitrated conventionally in a nitrating bath containing 28.0% of nitric acid, 54.3% of sulfuric acid, 14.7% of water, and 3.0% of nitrososulfuric acid. The resulting nitrocellulose was centrifuged to remove spent acid and then subjected to washing and boiling treatments to stabilize the product. The stabilized nitrocellulose having a nitrogen content of 12.0% was added to sufficient water to give a slurry containing about 6% solids. The acidity of the slurry was adjusted to 0.15% by the addition of 40% nitric acid. The acidulated slurry was then processed through a continuous digestion apparatus which provided a retention time of 30 minutes at 165° C. under a gage pressure of 100 pounds per square inch. The slurry was removed from the digester, excess liquor was drained off, and the nitrocellulose was spray-washed with water until the used wash water had a neutral pH. The nitrocellulose was dried and 25 parts of the dry nitrocellulose was dissolved in a solution of 18.75 parts of ethanol, 41.25 parts of toluene, and 15.0 parts of ethyl acetate (Formula C; ASTM D-301-56). The resulting solution had a color of 3.

Nitrocellulose prepared from shredded wood pulp as above and digested similarly but without acidulation of the slurry prior to digestion gave a test solution (Formula C) having a color of 6.

The nitrocellulose used in the present process may be prepared from suitable cellulosic material by conventional and well-known nitration procedures. The processes for the preparation and stabilization of nitrocellulose discussed by Emil Ott (editor) in Cellulose and Cellulose Derivatives, New York, Interscience Publishers, Inc. (1943), may be used, for instance. The composition of the nitrating bath and conditions of nitration are adjusted and controlled so as to produce nitrocellulose containing the desired amount of nitrogen, as is well-known to those skilled in the art.

The source of the nitrocellulose which is used in the present process is not critical insofar as the present invention is concerned. The nitrocellulose may be prepared from wood pulp, cotton linters, or other suitable cellulosic material, or mixtures thereof. Nitrocellulose prepared from cotton linters is generally sufficiently color-free for use in high-grade plastics and colorless surface coatings without a bleaching treatment. However, nitrocellulose prepared from wood pulp is often not acceptable for high-grade plastics and surface coating formulations. Thus, the present process will most often be used for the treatment of nitrocellulose prepared from wood pulp, but it is to be understood that the applicability of the present invention is not restricted thereto.

The nitrocellulose is stabilized by conventional means, for example, by boiling with water for from 10 to 60 hours.

The digestion and concurrent bleaching step may be conducted in any suitable apparatus, either as a batch or continuous process. The apparatus described in U.S. Patents 1,818,733 and 1,911,201 was used in the examples and is eminently suitable. The conditions, i.e., retention time, temperature, and pressure, of the digestion step are regulate to produce nitrocellulose having the desired viscosity, as is well-known to those skilled in the art. The addition of nitric acid to the slurry does not necessitate any modification in the digestion conditions.

In order to achieve the desired bleaching of the nitrocellulose being treated, the aqueous slurry of nitrocellulose processed through the digestion step is acidulated with nitric acid. The final measured acidity of the slurry, prior to digestion, must fall in the range of 0.10% to 0.50% by weight. If the measured acidity is below 0.10% by weight, the desired bleaching does not take place; the product nitrocellulose, when dissolved in a solvent formulation, produces a solution having objectionably strong color. If the nitric acid concentration exceeds 0.50% by weight, the nitrocellulose may tend to decompose. The preferred nitric acid concentration is from 0.10% to 0.30% by weight.

The invention has been described in detail in the foregoing disclosure. The invention is not limited to the specific embodiments or procedures disclosed since many modifications will be readily apparent to those skilled in the art. Accordingly the invention is intended to be limited only by the following claims.

I claim:

1. In a process for the preparation of soluble nitrocellulose wherein the viscosity of stabilized nitrocellulose is reduced by subjecting an aqueous slurry of said nitrocellulose to a digestion treatment at an elevated temperature under pressure, the improvement which comprises bleaching said nitrocellulose concurrently with said digestion by adding nitric acid to said slurry prior to said digestion to produce a slurry consisting essentially of said nitrocellulose, water, and about from 0.10 to 0.50% by weight of nitric acid.

2. A process according to claim 1, wherein said stabilized nitrocellulose has a nitrogen content of from 11.8% to 12.2% by weight.

3. A process according to claim 1, wherein said nitrocellulose has been prepared from wood pulp.

4. A process according to claim 1, wherein said aqueous slurry prior to digestion has a nitric acid concentration of from 0.10% to 0.30% by weight.

References Cited in the file of this patent

UNITED STATES PATENTS

| | | |
|---|---|---|
| 1,598,949 | Webb | Sept. 7, 1926 |
| 1,818,733 | Milliken | Aug. 11, 1931 |
| 1,968,882 | Eskew | Aug. 7, 1934 |